D. FARRAR.
Feather Renovator.

No. 197,928. Patented Dec. 11, 1877.

Witnesses:
Arthur Stimson.
J. M. Shuck.

Inventor:
Daniel Farrar,
By Thomas G. Orwig,
Attorney.

UNITED STATES PATENT OFFICE.

DANIEL FARRAR, OF KIRKVILLE, IOWA.

IMPROVEMENT IN FEATHER-RENOVATORS.

Specification forming part of Letters Patent No. 197,928, dated December 11, 1877; application filed July 30, 1877.

*To all whom it may concern:*

Be it known that I, DANIEL FARRAR, of Kirkville, in the county of Wappello and State of Iowa, have invented an Improved Feather-Renovating Apparatus, of which the following is a specification:

The object of my invention is to furnish an improved means for renovating feathers in such a manner that all foreign substances, effete matter, and offensive odors may be readily and expeditiously removed, and the restored clean and pure feathers returned to the bed-tick or to a bag by the operation of machinery, without touching them with the hands.

It consists in arranging and combining a portable case, an elevated trap, a removable tank, having a combined steam-distributer and sediment-chamber, a stirring-reel, and a steam-generator, in such a manner that all foreign solids can be gathered into the elevated trap, and all effete soluble substances drained into the sediment-chamber, as hereinafter fully set forth.

Figure 1:
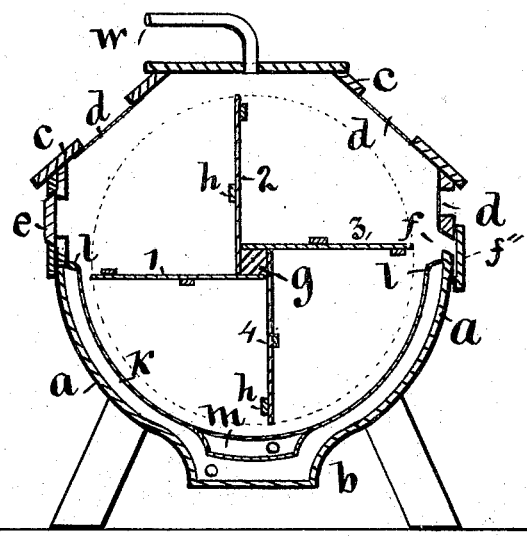

Figure 1 of my drawings is a central elevation of my combined portable case, stirring-reel, movable tank, and sediment-trap, and illustrates its construction and operation.

$a$ represents a semi-cylindrical steam-tight half-section of a case, made of wood, and supported upon suitable feet rigidly attached thereto. It is preferably about three feet in diameter and about twenty-eight inches in length, but may vary in size, as desired. $b$ is an enlargement, in form of a trough, extending across the lower and central portion of the section $a$ of the complete case, and is designed for the accommodation of my sediment-trap. $c$ is the top portion of my complete case, made of wood, preferably of octagon form, and corresponding in size with the lower half-section $a$, for which it forms a movable cover. $d\, d$ represent windows or openings, that have wire-cloth screens permanently fixed over them on the inside and movable tight doors on the outside. $e$ is a door, through which the feathers are introduced. $f$ is an inclined slot, extending horizontally between the case $a$ and its cover, to form an escape-passage, through which beans, pins, and other solid substances heavier than feathers are brushed by the action of the reel. $f''$ is a box-formed cover, hinged or otherwise secured over the slot $f$, so that, in combination with the wall of the case $a$ and the inclined walls of the slot $f$, it will form a trap for the reception of the solid foreign substances separated from the feathers. $g$ is the axle of a removable reel, that has its bearings formed in, or attached to, the sides of the semi-cylindrical case-section $a$. 1 2 3 4 are radial arms, rigidly attached to the axle $g$. $h\, h$ are cross-bars on the stirring-arms $g$. $k$ represents my removable tank. It conforms in size and shape with the semi-cylindrical section of the case $a$, and is preferably made of sheet-zinc. It is smaller than the case, and has outwardly-turned flanges $l\, l$ at its top edges, designed to rest upon the top edges of the lower section of the complete case, and to form a steam-chamber between the wall of the case and the tank. $m$ is a sediment-trap, formed on or attached to the under side of the tank $k$. This trap has a tight bottom and a perforated or reticulated top connecting it with the tank. The trap-covering retains the feathers in the tank, allows the sediment to drop from the feathers, and also serves to distribute the steam underneath the mass of feathers in the tank, and uniformly through them, to steam, purify, and wet them as it passes upward through the tank; and the steam admitted through a suitable port, and thus passed up through the trap, keeps the perforations in its cover from becoming fouled and closed with the adhesive matter extracted from the feathers.

Figure 2:
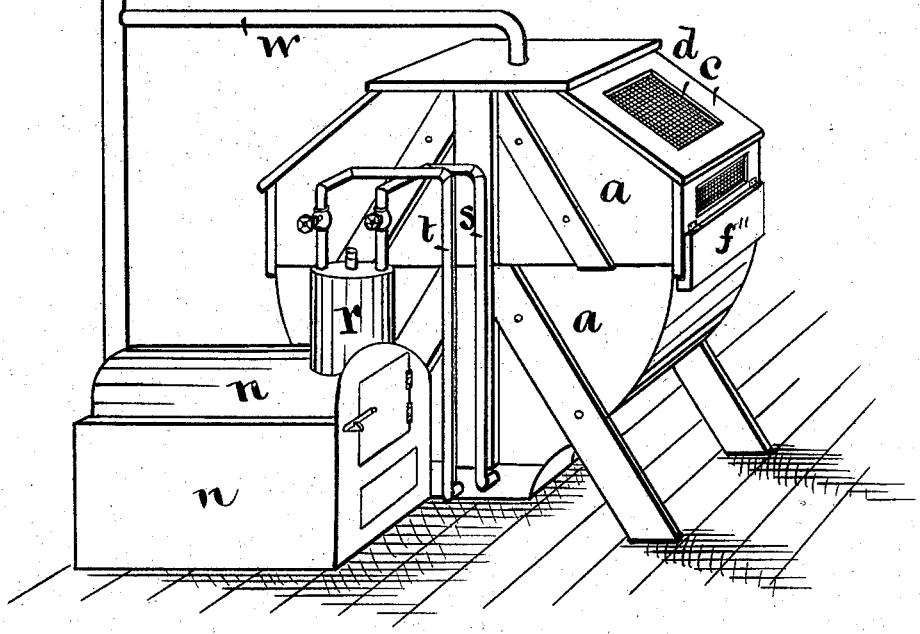

Fig. 2 is a perspective view of my complete apparatus, and further illustrates the construction and operation of my complete invention.

$n$ represents a furnace and boiler, combined to form a portable steam-generator. $r$ is the dome or steam-chest of the boiler. $s$ is an induction-tube, designed to convey steam into the bottom of the tank $k$. $t$ is a corresponding tube, designed to convey steam into the chamber formed underneath the tank $k$ and trap $m$. $w$ is an eduction-tube, connected with the top of the case-cover $c$ and with the smoke-flue of the furnace, to carry off waste steam and all offensive odors that may be extracted from the foul feathers.

In the practical operation of my invention,

I adjust all the parts of my apparatus properly, and then introduce the feathers to be renovated into the tank $k$ through the sliding door $e$. I then stir the feathers, while dry, by means of a crank on the end of the axle $g$ of the reel, and thereby cause all substances heavier than feathers to separate from the feathers. Moths, mice, pins, and all foreign substances may be thus speedily removed from the feathers and brushed into the trap $f\ f''$, from whence they can be readily removed by simply lifting the box-formed cover $f''$.

By means of the stop-cocks or globe-valves designed to be connected with the tubes $s$ and $t$, I let steam into the case to act upon the feathers. First, I pass steam through the conveying-tube $s$ into the bottom of the tank $k$, to subject the feathers to the cleansing and purifying action of a current of steam. The steam condenses in the upper portion of the case, and the feathers become wet, and thus washed, and all the effete animal matter in the feathers is carried off and drained into the trap $m$, and the foul odors are conveyed into the smoke-flue of the furnace through the eduction-tube $w$, connected with the top portion of the case-cover. After thus washing, deodorizing, and renovating the feathers by subjecting them to the action of steam for five or ten minutes, I close the tube $s$ and open the tube $t$, to allow steam to enter the chamber and vacant space intervening between the bottom of the tank and the bottom of the case. By opening the windows $d$ in the case-cover, the steam will pass around under the tank and dry the feathers therein, and the moisture will escape through the screens of the open windows. To facilitate the drying of the feathers, I turn the reel and carry the feathers around in the case. The wet mass of feathers may be thus thoroughly dried in fifteen or twenty minutes, when they will be ready to be returned to the bed-tick, or any suitable receptacle.

After thus stirring and drying the feathers, I shut off the steam passing through the tube $t$, and open the escape $f$, and place the mouth of the bed-tick over it, and fasten it by means of hooks, or in any suitable way that will retain it close, while I drive the feathers into the tick from the tank and case by simply turning the revolving reel.

A simple, novel, and complete apparatus and method is thus provided for advantageously renovating and handling feathers.

I am aware that a case, a tank, a trap, a reel, and a steam-generator have been combined in a feather-renovator; but I claim that my manner of constructing an apparatus to separate pins, beans, and all other foreign solids from feathers, and gather them into an elevated trap, and to remove and gather the effete, soluble, and adhesive substances into a separate chamber, is novel and greatly advantageous.

I claim as my invention—

1. In a feather-renovator, the portable case $a\ b\ c$, elevated trap $f\ f''$, the removable tank $k$, the combined steam-distributer and sediment-chamber $m$, and the stirring-reel $g\ h$, when arranged and combined substantially as shown and described, to operate in the manner and for the purposes set forth.

2. The trap $f\ f''$, formed by means of the escape-passage $f$, and its box-formed covering $f''$, substantially as and for the purposes shown and described.

3. The feather-renovating apparatus composed of the case $a\ b$, the cover $c\ d\ d\ e$, the trap $f\ f''$, the tank $k$, having the trap $m$, the reel $g\ h$, the steam-generator $n$, and the conducting-tubes $s\ t\ w$, arranged and combined to operate substantially as shown and described.

DANIEL FARRAR.

Witnesses:
JAMES STEPHENSON,
JOSEPH HOUSE.